United States Patent [19]
Boutaghou et al.

[11] Patent Number: 5,486,961
[45] Date of Patent: Jan. 23, 1996

[54] RESILIENT COMPLIANT CLAMP FOR DATA STORAGE DISK DRIVES

[75] Inventors: Zine-Eddine Boutaghou; Randy J. Bornhorst; Douglas W. Johnson, all of Rochester, Minn.

[73] Assignee: International Business Machines Corporation, Armonk, N.Y.

[21] Appl. No.: 298,490

[22] Filed: Aug. 30, 1994

[51] Int. Cl.[6] ................................................. G11B 17/02
[52] U.S. Cl. .................... 360/99.12; 360/98.08; 360/99.05
[58] Field of Search ............................ 360/99.12, 98.08, 360/99.05

[56] References Cited

U.S. PATENT DOCUMENTS

| | | | |
|---|---|---|---|
| 3,587,074 | 6/1971 | Angle et al. | 340/174.1 C |
| 4,022,478 | 5/1977 | Stewart | 274/10 S |
| 4,577,756 | 3/1986 | Hennessy et al. | 206/44 |
| 4,835,637 | 5/1989 | Mach et al. | 360/98.01 |
| 4,864,443 | 9/1989 | Peterson | 360/99.12 |
| 4,933,927 | 6/1990 | Ross | 369/270 |
| 5,006,942 | 4/1991 | Brooks et al. | 360/98.08 |
| 5,014,143 | 5/1991 | Mori et al. | 360/99.12 |
| 5,025,340 | 6/1991 | Peters | 360/99.12 |
| 5,075,808 | 12/1991 | Johnson | 360/98.08 |
| 5,101,306 | 3/1992 | Johnson | 360/98.08 |
| 5,243,481 | 9/1993 | Dunckley et al. | 360/99.08 |
| 5,267,106 | 11/1993 | Brue et al. | 360/98.08 |
| 5,315,463 | 5/1994 | Dew et al. | 360/99.12 X |
| 5,392,178 | 2/1995 | Nishio et al. | 360/99.12 X |

FOREIGN PATENT DOCUMENTS

| | | | |
|---|---|---|---|
| 4195958 | 7/1992 | Japan | G11B 17/028 |

*Primary Examiner*—John H. Wolff
*Attorney, Agent, or Firm*—Robert W. Lahtinen; Roy W. Truelson; Matthew J. Bussan

[57] ABSTRACT

A clamp for securing one or more data storage disks to a hub is formed as a slightly frusto-conical shaped annulus of resilient material with inwardly and upwardly extending lobes that are displaced radially outward during installation about a hub. Clamping force is derived from the compression of the lobes which are captured by the hub and the twisting of the annulus from the frusto-conical configuration to a substantially radial orientation. The clamp is formed of a material that is softer than the disk to cause the clamp to be compliant and conform to the disk irregularities and thereby avoid compromising disk flatness. The clamp component material composition is also modified to achieve a coefficient of linear expansion that is identical to the disk. The outer periphery of the clamp presents an interrupted flange that permits a tool to engage the clamp, perform the assembly about the hub and be disengaged using automated equipment.

6 Claims, 6 Drawing Sheets

RESILIENT COMPLIANT CLAMP FOR DATA STORAGE DISK DRIVES

FIELD OF THE INVENTION

The present invention pertains to rotating rigid disk data storage devices and more particularly to a clamp for securing an assembly such as one or more disks about a spindle member.

BACKGROUND

The extensive dam storage needs of modern computer systems require large capacity mass data storage devices. A common storage device is the rotating magnetic disk drive.

A disk drive typically contains one or more smooth, flat disks which are rigidly attached to a common hub or spindle. The disks are stacked on the spindle parallel to each other and spaced apart so that they do not touch. A clamping mechanism rigidly secures the disk or disks to the hub. The disks and hub are rotated in unison at a constant speed by a spindle motor.

Each disk is formed of a solid disk-shaped base or substrate, having a hole in the middle for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disks in the magnetizable layer. To do this, minute magnetized patterns representing the data are formed in the magnetizable layer. The data patterns are usually arranged in circular concentric tracks. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle.

There is one transducer head for each disk surface containing data. The transducer head is an aerodynamically shaped block of material (usually ceramic) on which is mounted a magnetic read/write transducer. The block, or slider, flies above the surface of the disk at an extremely small distance as the disk rotates. The close proximity to the disk surface is critical in enabling the transducer to read from or write to the data patterns in the magnetizable layer. Several different transducer designs are used, and in some cases the read transducer is separate from the write transducer.

The actuator usually pivots about an axis to position the head. It typically includes a solid block near the axis having comb-like arms extending toward the disk, a set of thin suspensions attached to the arms, and an electro-magnetic motor on the opposite side of the axis. The transducer heads are attached to the suspensions, one head for each suspension. The actuator motor rotates the actuator to position the head over a desired data track. Once the head is positioned over the track, the constant rotation of the disk will eventually bring the desired sector adjacent the head, and the data can then be read or written.

The clamp that secures one or more data storage disks within an enclosure for rotation in unison with a hub must meet several well recognized design constraints. Among these are the ability to preclude slippage of the disk relative to other portions of the rotating assembly during acceleration and deceleration of the spindle assembly and the capability to resist side shock loads without displacement of a disk with respect to the balance of the assembly. In addition, the clamping force must not distort the disk and the clamp must be capable of assembly and removal without damage to other assembly components including the disks, spindle motor or spindle bearing assemblies and further, the device must not be the source of contaminants within the enclosure in the form of either debris or outgassing of the component materials.

A typical clamping technique is the use of a series of screws that are equiangularly spaced to secure a circular clamp to compressively retain the disk or disks between the clamp and a flange formed as a part of the hub. This technique results in the localized distortion of the disk adjacent the site of each screw. This phenomena was of little consequence when larger disk sizes and lower a real recording densities were used, but such factors are of concern as disk drive miniaturization occurs. Further, with drives using 1.8 inch diameter disks and subject to the dimensional limitations of the associated form factor, the use of a pattern of clamping bolts with the required torque limitations is an unacceptable solution for purposes of mass production manufacturing.

A solution which is a more acceptable manufacturing technique is the use of a shrink fit clamp which is assembled using the required clamping force and allowed to cool and establish a shrink fit about the hub. However, when this approach is utilized in the environment of a small drive using a 1.8 inch diameter disk, the radial constricting forces tend to affect the running accuracy of the bearing assembly that is mounted at the opposite side of the same hub wall.

Any clamping technique must be considered with respect to the problems of radial and axial runout that can be influenced by distortion induced by the clamping forces. Radial distortion causes tracks to become non-circular, but the problem can be overcome by writing the tracks subsequent to assembly of the disks to the hub. Axial runout is the variation in disk flatness or the departure from a planar surface that tend to vary the flyheight of the transducer head during a cycle of rotation. As the air bearing separating the transducer head from the disk becomes smaller, such as approaching two microinches, the disk flatness becomes a significant concern and phenomena, such as disk clamping, that influence such flatness must not impair or compromise this disk parameter.

The objective is to design an inexpensive clamp with an extra low profile to provide both axial and radial clamping forces. Although many of the design problems have long been recognized, the attendant difficulties have become progressively more acute as requirements call for continuously higher areal data recording densities and smaller physical dimensions. Disk diameters of the smallest disk drives have progressed from 3.5 inches, to 2.5 inches, and presently to 1.8 inches. In addition, it must be anticipated that the future will have a requirement for a drive using one inch diameter disks.

SUMMARY OF THE INVENTION

Many disk clamping techniques are adequate for drives of larger size which provide ample space for manufacturing and assembly procedures. Such devices are not as sensitive to minor distortions induced by clamping or securing devices; use heavier structures such as thicker walls and support members and are not as subject to cost escalation when close tolerance parts are required. All of these factors become more critical design considerations as the overall devices and assemblies are miniaturized.

The resilient clamping member of the present invention includes an annulus portion from which a series of integral ears or lobes extend from the inner diameter surface and are capable of deformation under an axial load for insertion about a hub and capture beneath a flange presented by the hub. The clamp has an annular body portion which presents frusto-conical axial end surfaces in the unstressed, unassembled condition that are displaced to a substantially radial orientation in the assembled condition. One or more disks supported on the hub are compressively retained by the clamp which has an annular projection at the axial side confronting the disk surface and is compressed against the disk surface in the assembled condition.

The durometer or stiffness of the clamp; the dimensions of the annulus, lobes and annular projection; and the degree of the annular end surface frusto-conical departure from radial are selected to induce a predetermined clamping force to be exerted on the disk stack in The assembled condition. The polymer material of which the clamp is formed is also of a modified composition to achieve a clamp coefficient of linear expansion that is the same as the coefficient of linear expansion of the disk. Thus upon heating and cooling of the device a differential expansion and contraction of the disk assembly component parts will not occur and disk displacement from this source is precluded.

Another attribute of the clamp composition is that the material is softer than the disk material and is more compliant. Although the clamp end presents a smooth surface and the disk is highly surface finished to reduce any irregularities to microinch dimensions, both still present microscopic surface irregularities. With the compliant clamp, the clamp material deforms to conform to the disk surface whereby most distortions induced by interfering surface irregularities are accommodated by the clamp.

The clamp annulus is further provided with an interrupted flange at the outer diameter which permits an assembly and alignment tool to retain the clamp during the assembly procedure. Following assembly, the tool is rotated to cause disengagement from the flange portions and permit axial withdrawal through the peripheral spaces between the flange portions. This makes the clamp design readily adaptable to automated assembly.

DETAILED DESCRIPTION

Figure 9:
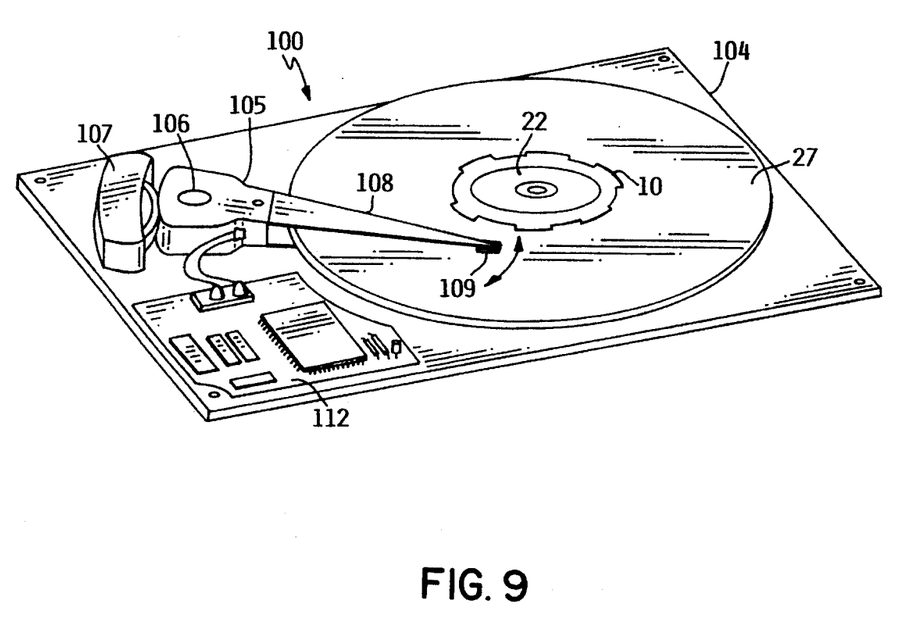
FIG. 9 shows a magnetic disk drive storage unit according to the preferred embodiment of the present invention.

FIG. 9 shows a magnetic disk drive storage unit 100 in accordance with the preferred embodiment. Disk unit 100 comprises rotatable disk 27, which is rigidly attached to hub assembly or spindle 22 and held in place by clamp 10. Hub assembly 22 is rotatably mounted on disk drive base or housing 104. Spindle 22 and disk 27 are driven by a drive motor at a constant rotational velocity. The drive motor is contained within hub assembly 22. Actuator assembly 105 is situated to one side of disk 27. Actuator 105 rotates through an arc about shaft 106 parallel to the axis of the spindle, driven by electro-magnetic motor 107, to position the transducer heads. A cover (not shown) mates with base 104 to enclose and protect the disk and actuator assemblies. Electronic modules for controlling the operation of the drive and communicating with another device, such as a host computer, are mounted on a circuit card 112 within the head/disk enclosure formed by base 104 and the cover. In this embodiment, circuit card 112 is mounted within the enclosure and shaped to take up unused space around the disk in order to conserve space, as would be used for a small form factor. However, the card 112 could also be mounted outside the head/disk enclosure, or the base itself could be made as a circuit card for mounting electronic modules directly to it. A plurality of head/suspension assemblies 108 are rigidly attached to the prongs of actuator 105. An aerodynamic read/write transducer head 109 is located at the end of each head/suspension assembly 108 adjacent the disk surface.

While disk drive 100 is shown with a single disk such as would be used for a small form factor (e.g., PCMCIA Type II form factor), it should be understood that the present invention could utilize a drive having multiple disks mounted on the spindle.

Figure 1:
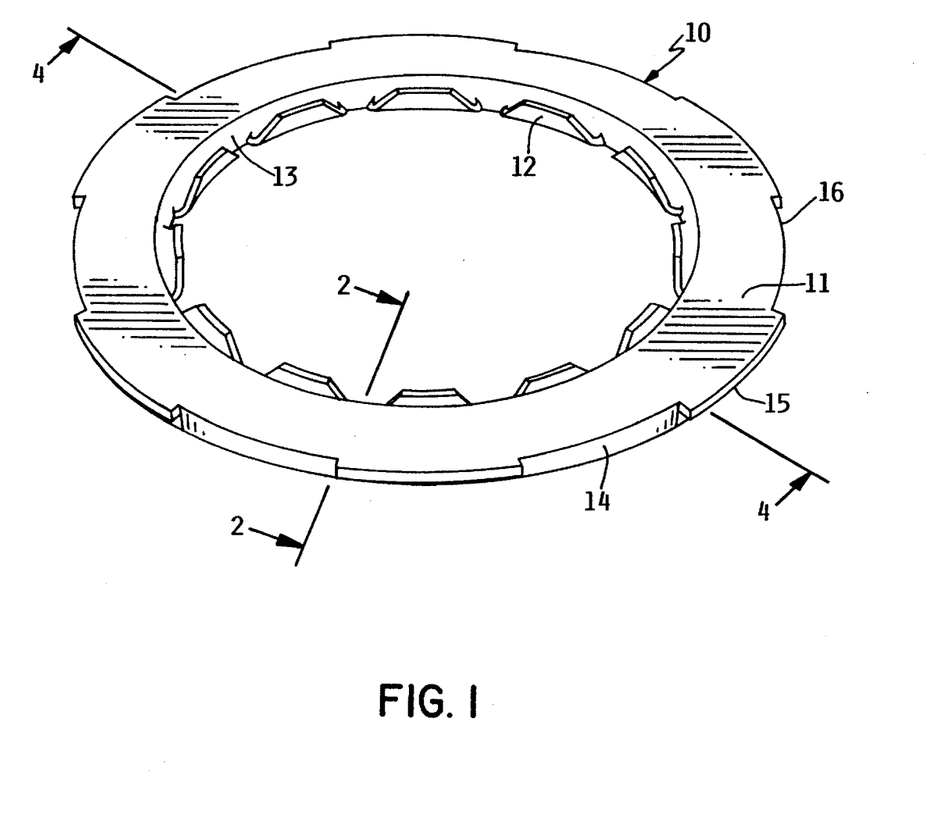
FIG. 1 is an isometric view of a preferred embodiment of the clamp element of the present invention.
Figure 2:
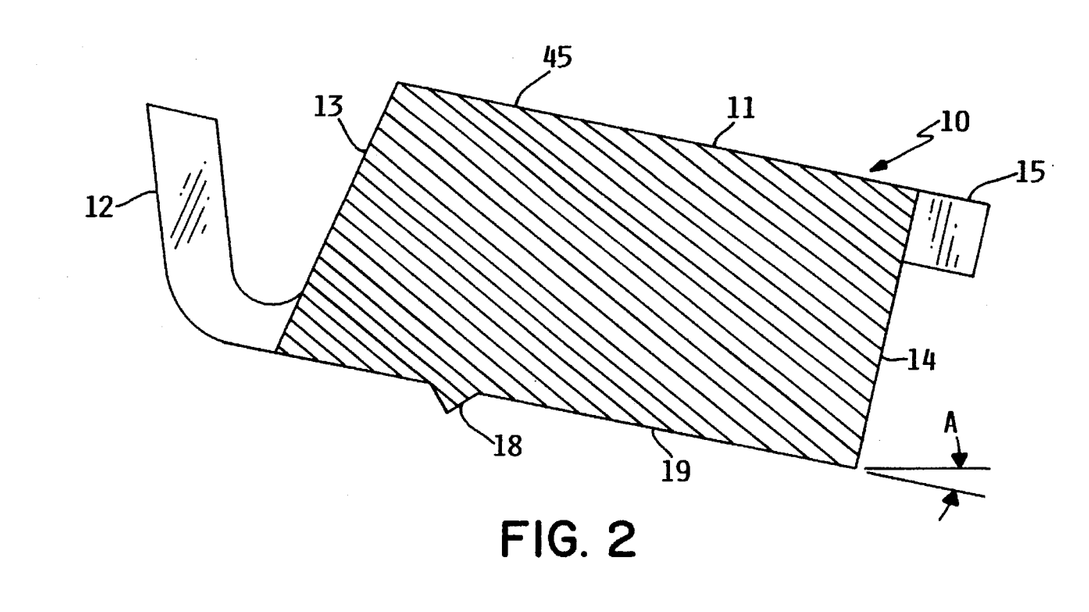
FIG. 2 is a section view of the clamp of FIG. 1 taken along line 2—2 of FIG. 1.
Figure 3:
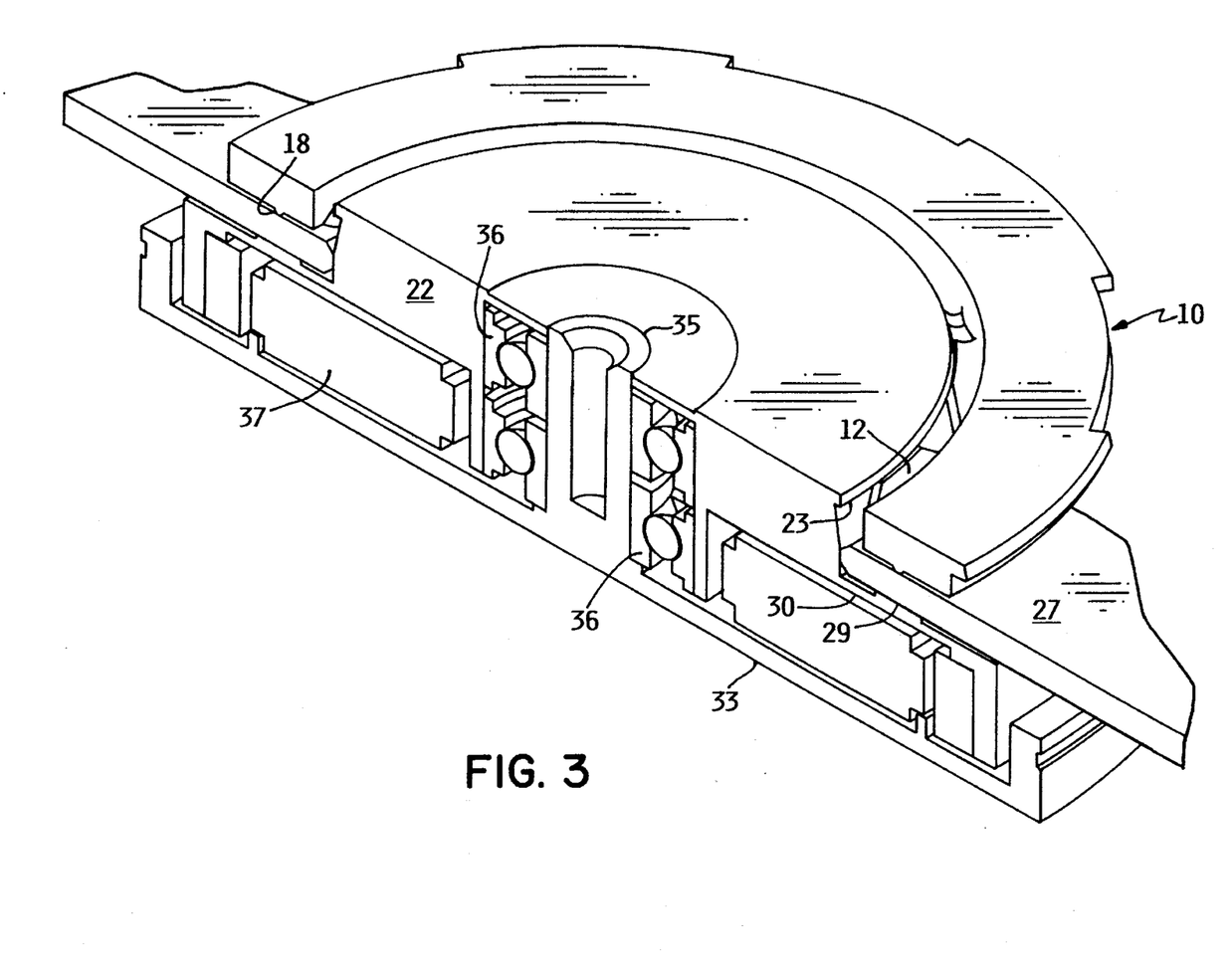
FIG. 3 is an isometric section view, partly broken away, of the hub disk assembly mounted on the spindle motor base member which includes the shaft about which the hub-disk assembly rotates.
Figure 4:
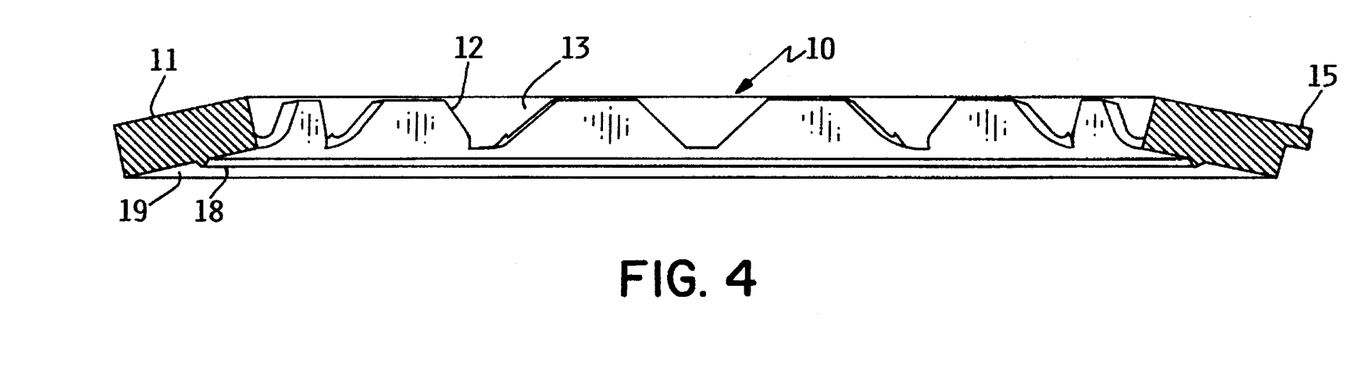
FIG. 4 is a section view of the clamp taken along line 4—4 of FIG. 1.

FIG. 1 is an isometric view of the preferred embodiment of the clamp 10 of the present invention. The clamp 10 includes an annulus 11 from which a series of ears or lobes 12 extend from an inner diameter, generally frusto-conical surface 13. At the outer generally cylindrical surface 14, an interrupted flange is formed with a series of six flange type projections 15 separated by a like series of interrupted angular portions 16. FIGS. 2 and 4 also show the lobes 12 which extend inward and upward from the surface 13 and the flange segments 15. The lobes 12 upward and inward projection and the reduced thickness permit axial assembly of the clamp 10 wherein the lobes 12 yield radially inward as the clamp is forced over the end of the hub 22. As the clamp is axially forced over the hub, the ears or lobes 12 spring behind the hub flange 23 as seen in FIG. 3 showing the assembled condition. Additionally, an annular projection 18 extends axially downward from the annulus lower surface 19. The upper and lower axial end surfaces 45 and 19 of the clamp annulus 11 are slightly frusto-conical, diverging from a radial plane by an angle A of 12 degrees as shown. In the assembled condition, the displacement or twisting of the clamp annulus 11 to a configuration where the axial end surfaces are substantially radial provides a significant portion of the clamping force. The angle A may vary widely depending upon the component material parameters, the clamping force used and the geometry of both the clamp and the cooperating spindle hub. For example, if the clamp design were used with a glass disk, the amount of glass filler added to the resilient plastic material would be significantly increased to achieve a clamp coefficient of thermal expansion that is identical to that of the glass disk. Such a clamp would have a reduced resiliency and accordingly the magnitude of the angle A would be reduced.

Clamp 10 requires the use of a compliant material such as polymer based materials. In the environment of the present invention, Ultem[1] 6000/2400 was selected due its superior thermal stability. Polymer based materials are readily available which have good thermal behavior, limited susceptibility to humidity and low outgassing tendencies. The material has further been filled with glass and carbon to match the coefficient of linear expansion of the aluminum disk.

[1] Trademark of GE Company

FIG. 3 shows the assembled clamp 10 compressively retaining the disk 27 to the hub 22. With the clamp captured by the cooperation of the flange 23 with the clamp lobes 12, the annular projection 18 compresses and deforms against the upper surface of disk 27 to compressively retain the disk against the raised annular surface 29 of the hub flange 30. FIG. 3 also illustrates the organization of the hub and spindle motor. A compressive force is also applied by displacement of the clamp from the frusto-conical configuration of the unassembled clamp to the substantially radial surface of the axial ends in the assembled condition. The spindle motor includes a base member 33 from which projects a dead shaft 35 about which the hub-disk assembly rotates, being supported on the shaft 35 by a pair of ball bearing assemblies 36. The spindle motor includes core and winding elements 37 supported on the base surface 33 and an annular permanent magnet 39 secured to the hub 22. Hub 22 is formed of steel which provides electromagnetic isolation of the spindle motor from the other magnetic systems of the data storage drive mechanism and eliminates the need for an additional magnetically permeable element to provide a flux path for the motor.

It should be appreciated that while the figures illustrating the structure of the clamp of the present invention are shown enlarged for ease of understanding, in the actual environment of use, the clamp is much smaller. In a disk drive using 1.8 inch diameter disks, the inner diameter of the disk 27 of FIG. 3 is 18 mm, only a fraction of the dimension of the illustration.

Figure 5:
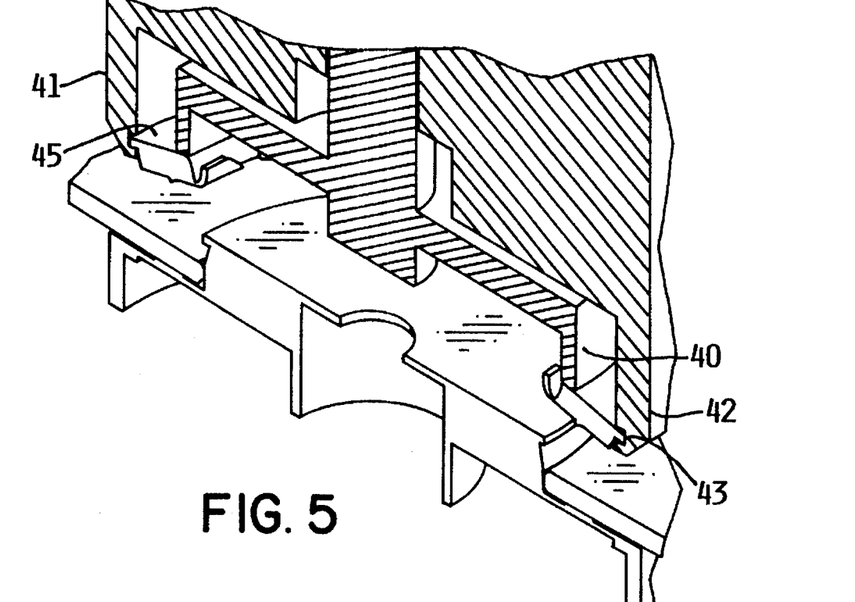
FIGS. 5 through 8 show the hub, disk and clamp of FIG. 3 and further illustrate a pusher tool and a housing tool, all partly in section and partly broken away, with the figures depicting successive; stages of an automated assembly of the clamp of the present invention.

FIGS. 5 through 8 show the sequence of securing the clamp 10 to the hub 22 to compressively capture the disk 27 therebetween. In addition to the enumerated spindle assembly parts, a pusher tool 40 and a housing tool 41 are shown with each of the assembly elements and the tools partly in section and partly broken away, to schematically illustrate the assembly procedure. It will be observed that the clamp normally has a somewhat conical configuration, as shown in FIG. 5 until compressed and flattened into the assembled condition. The housing tool 41 has six downwardly extending projections 42 that present grooves 43 in which the clamp flange portions 15 are received to retain and align the unassembled clamp. In FIG. 5, pusher tool 40 is in a relaxed or upwardly retracted position.

Figure 6:
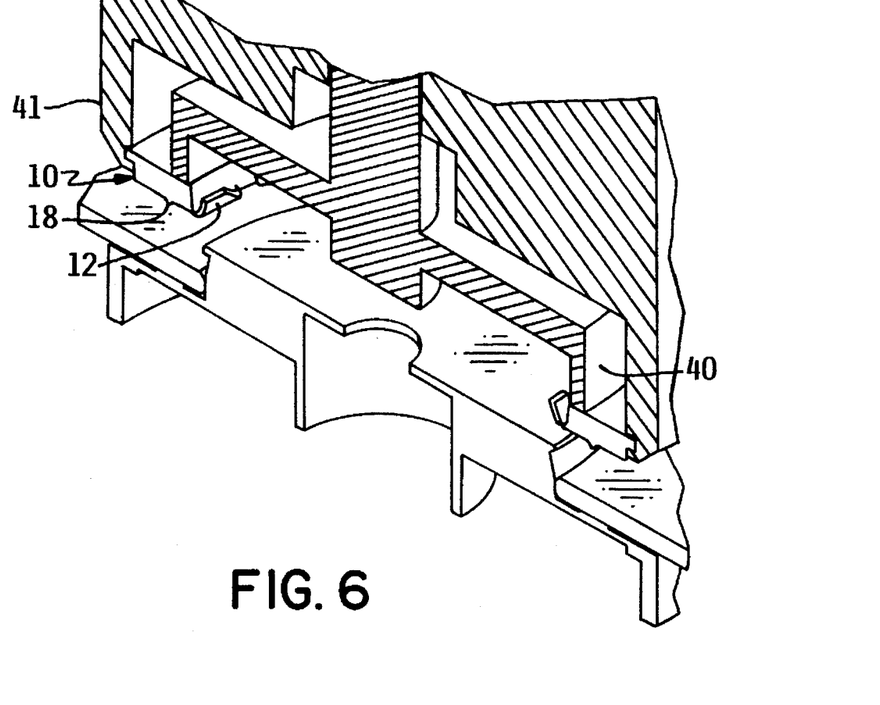

In FIG. 6, pusher tool 40 has been advanced to engage or flatten the clamp as shown with the annular surface of the tool abutting the top surface 45 of annulus 11 adjacent the inner diameter. The clamp is now prepared to be assembled to the hub.

Figure 7:
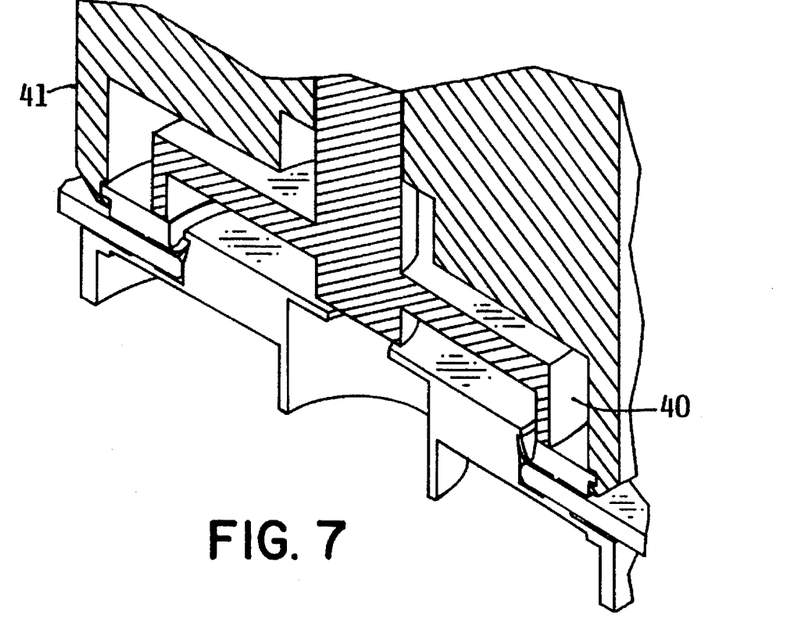

FIG. 7 shows the clamp 10 assembled to the hub 22 as the pusher tool 40 and housing tool 41 are both moved axially downward causing the clamp lobes 12 to deflect radially inward, pass over the end of hub 22 and snap into the secured, assembled position behind the hub flange 23. The clamp 10 is now on the hub 22 with the pusher tool 40 still holding it in the flattened configuration.

Figure 8:
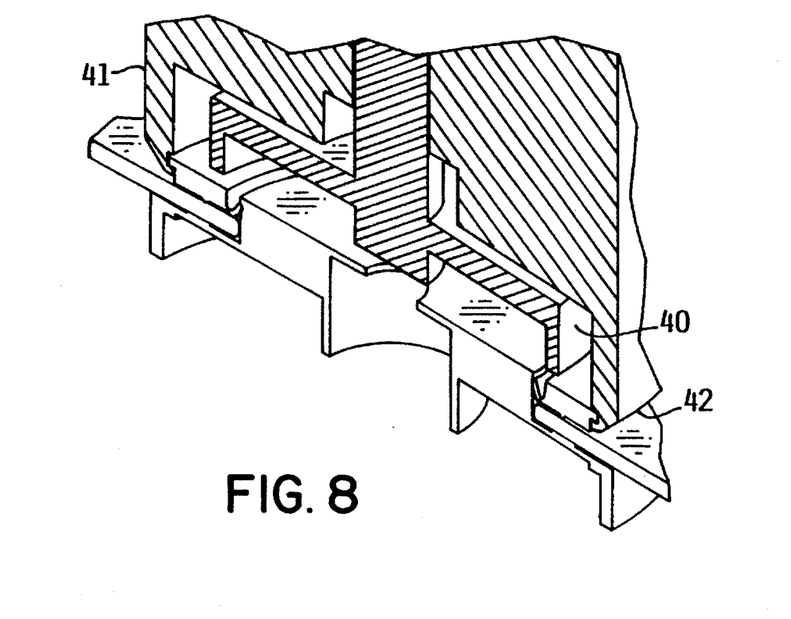

In FIG. 8, the pusher tool 40 has been retracted and the clamp is loaded against the disk. The assembly is now completed and it only remains for the housing tool to be rotated 30 degrees to align the projections 42 with the spaces 16 intermediate the clamp flange portions 15 and allow axial removal of the tool assembly from the clamp 10.

Using the compliant clamp of the present invention, the total indicated runout (TIR) that measures the axial variation of the disk surface flatness during rotation, shows no significant difference between clamped and unclamped disks. When associated with thinner aluminum disks of 15 to 20 mils thickness, the TIR was substantially unchanged when disks were clamped and with thicker aluminum disks of 25 mils, the TIR of the clamped disks was actually lower than that of the unclamped disks.

While the invention:has been particularly shown and described with reference to a preferred embodiment thereof, it will be understood by those skilled in the art that various changes in form and details may be made therein without departing from the spirit and scope of the invention.

What is claimed is:

1. A disk data storage device comprising:
   a base;
   at least one disk having first and second surfaces, said first surface being axially spaced from said second surface, at least one of said first and second surfaces having a layer for recording data;
   a hub mounted for rotation on said base, said hub supporting said at least one disk at said first surface of said disk and presenting a flange in axial spaced relation to said at least one disk at said second surface of said disk;
   a resilient clamping member clamping said disk to said hub, comprising
   (a) an annulus formed of resilient material including a first portion at an inner radius of said annulus, the annulus first portion extending radially inward and axially toward said flange to fixedly secure said annulus first portion to said hub and maintain said annulus in a deformed state, and
   (b) a projecting portion of said annulus at an annulus lower surface of said annulus, the projecting portion confronting said at least one disk and deforming against the second surface of said disk when said annulus is maintained in said deformed state and said annulus first portion is retained by said flange, whereby said disk is compressively clamped to said hub; and
   a transducer mounted on an actuator for accessing data recorded in said layer of said disk.

2. The disk data storage device of claim 1 wherein said resilient clamping member is formed of a material with a lesser hardness than said disk whereby the clamp projecting portion deforms to conform to surface irregularities of the confronting disk.

3. The disk data storage device of claim 2 wherein said resilient clamping member has a coefficient of linear expansion substantially identical to the coefficient of linear expansion of said confronting disk whereby during heating or cooling of the assembly a differential expansion or contraction does not occur.

4. The disk data storage device of claim 1 wherein said projecting portion of said annulus comprises an annular raised portion that makes continuous annular contact with the second surface of the said confronting disk.

5. The disk data storage device of claim 1 wherein said annulus first portion comprises a plurality of lobes that extend radially inward and axially upward to define a generally inclined inner surface that allows deformation as the annulus is pressed axially over said flange and presents an upper surface that engages the flange in the assembled condition.

6. The disk data storage device of claim 1 wherein said annulus has an interrupted outer flange portion adjacent an under surface of the annulus opposite said annulus lower surface.

* * * * *